(12) United States Patent
Turnbull et al.

(10) Patent No.: US 10,359,682 B2
(45) Date of Patent: Jul. 23, 2019

(54) VARIABLE TRANSMITTANCE WINDOW SYSTEM

(71) Applicant: Gentex Corporation, Zeeland, MI (US)

(72) Inventors: Robert R. Turnbull, Holland, MI (US); David I. Driscoll, Caledonia, MI (US); Bradley L. Busscher, Grand Rapids, MI (US); Kevin L. Ash, Grand Rapids, MI (US); Christian M. Kemperman, Grand Haven, MI (US)

(73) Assignee: GENTEX CORPORATION, Zeeland, MI (US)

(*) Notice: Subject to any disclaimer, the term of this patent is extended or adjusted under 35 U.S.C. 154(b) by 83 days.

(21) Appl. No.: 14/505,639

(22) Filed: Oct. 3, 2014

(65) Prior Publication Data
US 2015/0098121 A1 Apr. 9, 2015

Related U.S. Application Data

(60) Provisional application No. 61/887,093, filed on Oct. 4, 2013, provisional application No. 61/911,851, filed
(Continued)

(51) Int. Cl.
*G02F 1/163* (2006.01)
*B60J 3/04* (2006.01)

(52) U.S. Cl.
CPC ............... *G02F 1/163* (2013.01); *B60J 3/04* (2013.01)

(58) Field of Classification Search
CPC ............... G02F 1/15; G02F 1/163; B60J 3/04
(Continued)

(56) References Cited

U.S. PATENT DOCUMENTS

| 3,521,941 A | 7/1970 | Kumar et al. |
| 4,640,583 A | 2/1987 | Hoshikawa et al. |

(Continued)

FOREIGN PATENT DOCUMENTS

| EP | 0947874 | 6/1999 |
| EP | 0947875 | 6/1999 |

(Continued)

OTHER PUBLICATIONS

Patent Cooperation Treaty, International Searching Authority, International Search Report, Written Opinion of the International Searching Authority and Notification of Transmittal, dated Feb. 19, 2015, 7 Pages.

(Continued)

*Primary Examiner* — Robert E. Tallman
*Assistant Examiner* — Gary W O'Neill
(74) *Attorney, Agent, or Firm* — Price Heneveld LLP; Bradley D. Johnson

(57) ABSTRACT

A variable transmittance window system is provided and includes at least one variable transmittance window. At least one energy harvesting device generates electrical power. A power supply circuitry maximizes the electrical power. At least one energy storage device is charged by the electrical power. A slave control circuitry controls a transmittance state of the at least one variable transmittance window, the slave control circuitry being powered by at least one of the power supply circuitry and the at least one energy storage device. A master control circuitry monitors the slave control circuitry, wherein the master control circuitry is operable to issue a wireless override signal to the slave control circuitry such that the slave control circuitry changes the transmittance state of the at least one variable transmittance window to an override transmittance state.

18 Claims, 7 Drawing Sheets

Related U.S. Application Data on Dec. 4, 2013, provisional application No. 61/916,431, filed on Dec. 16, 2013.

(58) Field of Classification Search
USPC .................................................. 359/265, 275
See application file for complete search history.

(56) References Cited

U.S. PATENT DOCUMENTS

| | | | |
|---|---|---|---|
| 4,646,158 A | 2/1987 | Ohno et al. | |
| 4,702,566 A | 10/1987 | Tukude | |
| 4,893,908 A | 1/1990 | Wolf et al. | |
| 4,917,477 A | 4/1990 | Bechtel et al. | |
| 5,004,961 A | 4/1991 | Berner et al. | |
| 5,066,111 A | 11/1991 | Singleton et al. | |
| 5,092,939 A | 3/1992 | Nath et al. | |
| 5,124,832 A | 6/1992 | Greenberg et al. | |
| 5,136,419 A | 8/1992 | Shabrang | |
| 5,161,048 A | 11/1992 | Rukavina | |
| 5,228,925 A | 7/1993 | Nath et al. | |
| 5,384,578 A | 1/1995 | Lynam et al. | |
| 5,384,653 A | 1/1995 | Benson et al. | |
| 5,612,847 A | 3/1997 | Malecke et al. | |
| 5,654,736 A | 8/1997 | Green et al. | |
| 5,657,149 A | 8/1997 | Buffat et al. | |
| 5,724,176 A | 3/1998 | Nishikitani et al. | |
| 5,724,187 A | 3/1998 | Varaprasad et al. | |
| 5,725,809 A | 3/1998 | Varaprasad et al. | |
| 5,805,330 A | 9/1998 | Byker et al. | |
| 5,838,483 A | 11/1998 | Teowee et al. | |
| 5,889,608 A | 3/1999 | Buffat et al. | |
| 5,995,273 A | 11/1999 | Chandrasekhar | |
| 6,020,989 A | 2/2000 | Watanabe | |
| 6,045,724 A | 4/2000 | Varaprasad et al. | |
| 6,055,089 A | 4/2000 | Schulz et al. | |
| 6,056,410 A | 5/2000 | Hoekstra et al. | |
| 6,084,702 A | 7/2000 | Byker et al. | |
| 6,166,496 A | 12/2000 | Lys et al. | |
| 6,207,083 B1 | 3/2001 | Varaprasad et al. | |
| 6,210,008 B1 | 4/2001 | Hoekstra et al. | |
| 6,245,262 B1 | 6/2001 | Varaprasad et al. | |
| 6,254,003 B1 | 7/2001 | Pettinelli et al. | |
| 6,317,248 B1 | 11/2001 | Agrawal et al. | |
| 6,406,152 B1 | 6/2002 | Hoekstra et al. | |
| 6,407,847 B1 | 6/2002 | Poll et al. | |
| 6,474,820 B1 | 11/2002 | Hoekstra et al. | |
| 6,528,782 B1* | 3/2003 | Zhang | B60J 3/04 250/205 |
| 6,567,708 B1 | 5/2003 | Bechtel et al. | |
| 6,621,616 B1 | 9/2003 | Bauer et al. | |
| 6,770,068 B2 | 8/2004 | Ruiz et al. | |
| 6,829,511 B2 | 12/2004 | Bechtel et al. | |
| 6,853,472 B2 | 2/2005 | Warner et al. | |
| 6,906,632 B2 | 6/2005 | DeLine et al. | |
| 6,961,168 B2 | 11/2005 | Agrawal et al. | |
| 6,963,437 B2 | 11/2005 | Bauer et al. | |
| 7,085,609 B2 | 8/2006 | Bechtel et al. | |
| 7,256,924 B2 | 8/2007 | Guarr et al. | |
| 7,274,501 B2 | 9/2007 | McCabe et al. | |
| 7,450,291 B2 | 11/2008 | Guarr et al. | |
| 7,471,438 B2 | 12/2008 | McCabe et al. | |
| 7,542,809 B2 | 6/2009 | Bechtel et al. | |
| 7,822,490 B2 | 10/2010 | Bechtel et al. | |
| 8,219,217 B2 | 7/2012 | Bechtel et al. | |
| 8,547,624 B2 | 10/2013 | Ash et al. | |
| 2002/0093741 A1* | 7/2002 | Bechtel | B60Q 1/1423 359/604 |
| 2004/0160660 A1 | 8/2004 | Malvino | |
| 2005/0063036 A1 | 3/2005 | Bechtel et al. | |
| 2005/0156753 A1 | 7/2005 | DeLine et al. | |
| 2005/0200935 A1 | 9/2005 | Liu et al. | |
| 2006/0158715 A1 | 7/2006 | Furusawa et al. | |
| 2007/0285759 A1* | 12/2007 | Ash | B60J 3/04 359/275 |
| 2008/0230653 A1* | 9/2008 | Mitchell | B60J 3/04 244/129.3 |
| 2008/0239451 A1* | 10/2008 | Mitchell | G02F 1/15 359/265 |
| 2008/0239452 A1 | 10/2008 | Xu et al. | |
| 2010/0235657 A1 | 9/2010 | Cho | |
| 2011/0163866 A1 | 7/2011 | Ghannam et al. | |
| 2012/0218618 A1 | 8/2012 | Tonar et al. | |

FOREIGN PATENT DOCUMENTS

| | | |
|---|---|---|
| EP | 0947876 | 6/1999 |
| RU | 2313642 | 12/2007 |
| RU | 2369490 | 10/2009 |
| RU | 120823 | 9/2012 |
| WO | WO 98/57228 | 12/1998 |
| WO | 2012156779 A1 | 11/2012 |

OTHER PUBLICATIONS

R. Sullivan et al., "Effect of Switching Control Strategies on the Energy Performance of Electrochromic Windows," SPIE, vol. 2255, pp. 443-455 (Feb. 1994).

A.W. Czanderna et al., "Durability Issues and Service Lifetime Prediction of Electrochromic Windows for Buildings Applications," Solar Energy Materials & Solar Cells, 56 (1999), pp. 419-436.

European Patent Office, "Supplemental European Search Report," dated Aug. 24, 2016, 7 pages, Kiernan, Lawrence, Munich, Germany.

* cited by examiner

VARIABLE TRANSMITTANCE WINDOW SYSTEM

CROSS-REFERENCE TO RELATED APPLICATIONS

This application claims benefit of and priority to U.S. Provisional Patent Application No. 61/887,093, filed on Oct. 4, 2013, entitled "VARIABLE TRANSMITTANCE WINDOW SYSTEM;" U.S. Provisional Patent Application No. 61/911,851, filed on Dec. 4, 2013, entitled "VARIABLE TRANSMITTANCE WINDOW SYSTEM;" and U.S. Provisional Patent Application No. 61/916,431, filed on Dec. 16, 2013, entitled "VARIABLE TRANSMITTANCE WINDOW SYSTEM," the disclosures of which are hereby incorporated herein by reference in their entirety.

FIELD OF THE INVENTION

The present invention generally relates to variable transmittance windows. More specifically, the present invention relates to a variable transmittance system in which variable transmittance windows are powered using energy harvesting devices.

SUMMARY OF THE INVENTION

According to at least one aspect of the present invention, a variable transmittance window system is provided and includes at least one variable transmittance window. At least one energy harvesting device is included for generating an electrical power. A power supply circuitry is included for maximizing the electrical power. At least one energy storage device is included and is configured to be charged by the electrical power. A slave control circuitry is included for controlling a transmittance state of the at least one variable transmittance window, the slave control circuitry being powered by at least one of the power supply circuitry and the at least one energy storage device. A master control circuitry is included and is configured to monitor the slave control circuitry, wherein the master control circuitry is operable to issue a wireless override signal to the slave control circuitry such that the slave control circuitry changes the transmittance state of the at least one variable transmittance window to an override transmittance state.

According to at least another aspect of the present invention, a variable transmittance window system is provided and includes at least one variable transmittance window. At least one energy harvesting device is included for generating electrical power. At least one energy storage device is included and is configured to be charged by the electrical power. A window control circuitry is included for controlling a transmittance state of the at least one variable transmittance window, the window control circuitry being powered by a power supply of the vehicle and at least one of the at least one energy harvesting device and the at least one energy storage device. A monitoring circuit is included and is communicatively coupled to the window control circuitry for monitoring the supply of power from the vehicle and for detecting that power is no longer being supplied from the vehicle power supply, wherein the window control circuitry darkens the at least one variable transmittance window after a predetermined time period after detection that power is no longer being supplied from the vehicle power supply.

According to at least another aspect of the present invention, a variable transmittance window system is provided and includes at least one variable transmittance window. At least one energy harvesting device is included for generating electrical power. A window control circuitry is included for controlling a transmittance state of the at least one variable transmittance window, the window control circuitry being powered by a power supply of the vehicle and the at least one energy harvesting device. A monitoring circuit is provided and is communicatively coupled to the window control circuitry for monitoring the supply of power from the vehicle and for detecting that power is no longer being supplied from the vehicle power supply. The window control circuitry darkens the at least one variable transmittance window after a predetermined time period after detection that power is no longer being supplied from the vehicle power supply.

These and other features, advantages, and objects of the present invention will be further understood and appreciated by those skilled in the art by reference to the following specification, claims, and appended drawings.

BRIEF DESCRIPTION OF THE DRAWINGS

The present invention will be become more fully understood from the detailed description and the accompanying drawings, wherein.

DETAILED DESCRIPTION OF THE PREFERRED EMBODIMENTS

Figure 1:
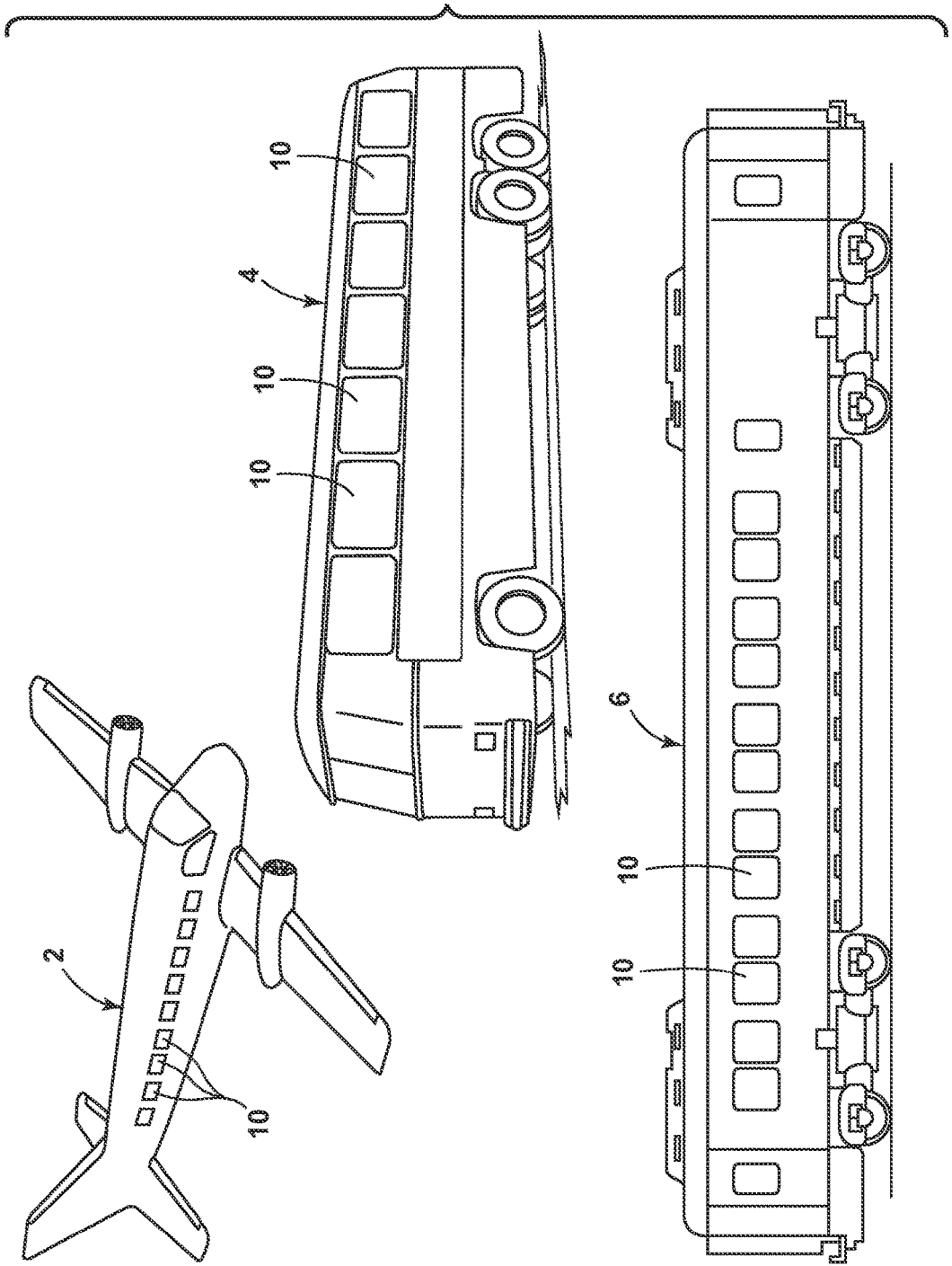
FIG. 1 is a general illustration of multi-passenger vehicles incorporating variable transmission windows, according to one embodiment of the present invention.

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

For purposes of description herein, the terms "upper," "lower," "right," "left," "rear," "front," "vertical," "horizontal," "top," "bottom," and derivatives thereof shall relate to the invention as shown in the drawings. However, it is to be understood that the invention may assume various alternative orientations, except where expressly specified to the contrary. It is also to be understood that the specific device illustrated in the attached drawings and described in the following specification is simply an exemplary embodiment of the inventive concepts defined in the appended claims. Hence, specific dimensions, proportions, and other physical characteristics relating to the embodiment disclosed herein are not to be considered as limiting, unless the claims expressly state otherwise.

The present invention relates to a variable transmittance window system in which one or more variable transmittance windows are powered using energy harnessing devices. Examples of variable transmittance windows include windows that are able to change their transmittance based on electrical signals applied to the window, such as the windows generally described in U.S. Pat. No. 6,407,847 entitled "ELECTROCHROMIC MEDIUM HAVING A COLOR STABILITY," U.S. Pat. No. 6,239,898 entitled "ELECTROCHROMIC STRUCTURES," U.S. Pat. No. 6,597,489 entitled "ELECTRODE DESIGN FOR ELECTROCHROMIC DEVICES," and U.S. Pat. No. 5,805,330 entitled "ELECTRO-OPTIC WINDOW INCORPORATING A DISCRETE PHOTOVOLTAIC DEVICE," the entire disclosures of each of which are incorporated herein by reference. Examples of electrochromic devices that may be used in windows are described in U.S. Pat. No. 6,433,914 entitled "COLOR-STABILIZED ELECTROCHROMIC DEVICES," U.S. Pat. No. 6,137,620 entitled "ELECTROCHROMIC MEDIA WITH CONCENTRATION-ENHANCED STABILITY, PROCESS FOR THE PREPARATION THEREOF AND USE IN ELECTROCHROMIC DEVICES," U.S. Pat. No. 5,940,201 entitled "ELECTROCHROMIC MIRROR WITH TWO THIN GLASS ELEMENTS AND A GELLED ELECTROCHROMIC MEDIUM," and U.S. Patent Application Publication No. 2006/0056003 entitled "VEHICULAR REARVIEW MIRROR ELEMENTS AND ASSEMBLIES INCORPORATING THESE ELEMENTS," the entire disclosures of each of which are incorporated herein by reference. Other examples of variable transmittance windows and systems for controlling them are disclosed in U.S. Pat. No. 7,085,609, entitled "VARIABLE TRANSMITTANCE WINDOW CONSTRUCTIONS," U.S. Pat. No. 6,567,708 entitled "SYSTEM TO INTERCONNECT, LINK, AND CONTROL VARIABLE TRANSMITTANCE WINDOWS AND VARIABLE TRANSMITTANCE WINDOW CONSTRUCTIONS," the entire disclosures of each of which are incorporated herein by reference.

FIG. 1 is a graphical representation of several vehicles employing one or more variable transmittance windows 10. These vehicles employing the variable transmittance windows 10 include, for example, an aircraft 2, a bus 4, and a train 6. As will be described in greater detail below, each of the vehicles generally illustrated in FIG. 1 may also include a variable transmittance window control system for controlling the variable transmittance windows 10. While FIG. 1 illustrates a few vehicles equipped with the variable transmittance windows 10, it should be appreciated that the variable transmittance windows 10 may be similarly equipped in other vehicles designed to hold passengers not mentioned herein. Further, it should also be appreciated that the variable transmittance windows 10 may be equipped on stationary objects such as buildings, homes, and the like. As such, they too are eligible to use the variable transmittance window control system described herein.

Figure 2:
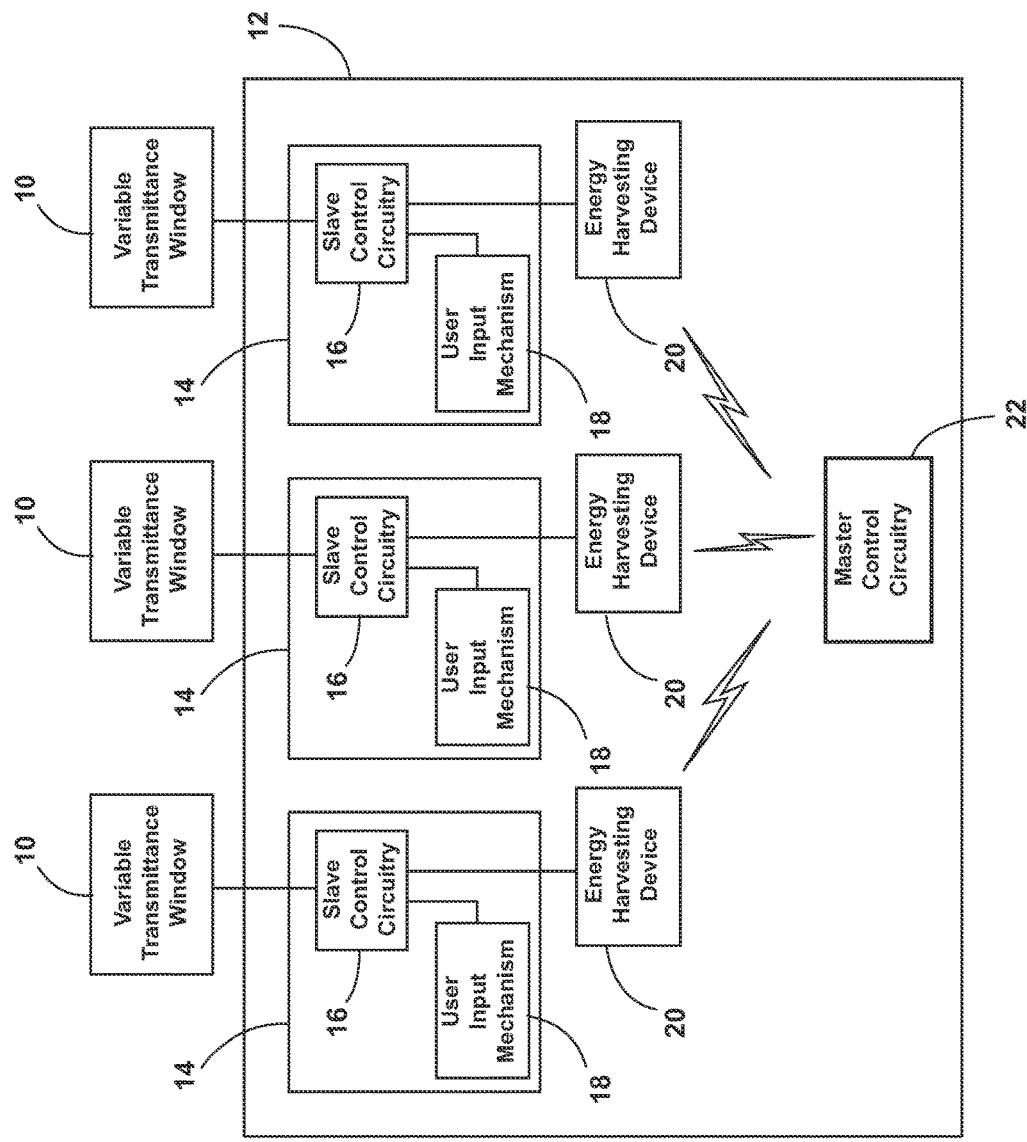
FIG. 2 is a block diagram generally illustrating a system for controlling variable transmission windows, according to the present invention.

FIG. 2 generally illustrates a variable transmittance window system including the variable transmittance windows 10 that may be equipped on an aircraft, along with a variable transmittance window control system 12 that is electrically coupled to the variable transmittance windows 10 for controlling the transmittance state of the variable transmittance windows 10. The variable transmittance window control system 12 includes a plurality of window control units 14 each coupled to at least one corresponding variable transmittance windows 10. Each window control unit 14 includes a slave control circuitry 16 for controlling the transmittance state of an associated variable transmittance window 10. Each window control unit 14 also includes a user input mechanism 18 coupled to the slave control circuitry 16 for providing a user input to the slave control circuitry 16 to change the transmittance state of the associated variable transmittance window 10.

Each window control unit 14 is coupled to one or more energy harvesting devices 20 configured to produce electrical power, which may be used to power the slave control circuitry 16, the user input mechanism 18, and the associated variable transmittance window 10 of each window control unit 14. In the illustrated embodiment, the energy harvesting device 20 associated with each window control unit 14 is coupled to the slave control circuitry 16 such that the slave control circuit 16 is responsible for providing electrical power to the associated variable transmittance window 10. In one embodiment, the slave control circuitry 16 provides power to the user input mechanism 18 and is also configured to monitor the circuitry included in the user input mechanism 18.

Referring still to FIG. 2, the slave control circuitry 16 of each window control units 14 is in wireless communication with a master control circuitry 22. The master control circuitry 22 is configured to monitor wireless signals transmitted from the slave control circuitry 16 and to transmit wireless signals to the slave control circuitry 16. To that end, both the slave control circuitry 16 and the master control circuitry 22 should include processing circuitry, including programmable logic, memory, and interface circuitry, to permit them both to generate, send, receive, and decode transmitted wireless signals.

The master control circuitry 22 is configured to issue wireless override signals to the window control units 14 to direct the slave control circuitry 16 of each window control unit 14 to change the transmittance state of the associated variable transmittance window 10. The transmittance state is selected by the wireless override signal sent by the master control circuitry 22. Wireless override signals issued to the slave control circuitry 16 may include signals to cause one, some, or all of the variable transmittance windows 10 to change to an override transmittance state. In so doing, the one or more variable transmittance windows 10 may darken, lighten, go to the darkest state, go to the lightest state, or go to a predetermined intermediate transmittance state in an incremental manner. Further, the master control circuitry 22 may direct all window control units 14 to alter the states of their variable transmittance windows 10 at the same time, one at a time, or in groups, in order to minimize system power loading, to optimize passenger comfort or to control lighting levels.

With respect to vehicles equipped with variable transmittance windows, the ability to override an existing transmittance state is especially useful. For instance, with respect to the aircraft setting described herein, a pilot or flight attendant may operate the master control circuitry 22 and exercise its overriding capabilities during take-off and landing by causing all applicable variable transmittance windows 10 to return to a lightened state. In another instance, the master control circuitry 22 may be operated to force all applicable variable transmittance windows 10 to darken in the event a movie is playing and/or passengers are sleeping. In any event, the master control circuitry 22 may be configured to maintain the override transmittance state for a predetermined period determined by the master control circuitry 22 or until the pilot or flight attendant removes the override. Thereafter, passengers seated next to one of the variable transmittance windows 10 will have the option to change its transmittance state to one providing greater individual comfort.

Although the variable transmittance windows 10 are shown each having their own slave control circuitry 16, user input mechanism 18, and energy harvesting device 20, it should be appreciated that a variety of combinations are possible. For instance, in an alternative embodiment, one user input mechanism 18 may change the transmittance state of multiple variable transmittance windows 10. In another alternate embodiment, a transmittance state selected by a user via the user input mechanism 18 of one window control unit 14 may be wirelessly transmitted to other window control units 14 via interaction between the slave control circuitries 16 of the participating window control units 14. The slave control circuitries 16 may relay messages intended for one another to extend the range of the wireless network. In another embodiment, one user input mechanism 18 may be directly coupled to the slave control circuitry 16 of more than one window control unit 14. In still another embodiment, one slave control circuitry 16 may control multiple variable transmittance windows 10. In still another embodiment, one energy harvesting device 20 may be coupled to more than one window control units 14. In yet another embodiment, more than one energy harvesting device 20 may be coupled to one or more window control units 14.

Figure 3:
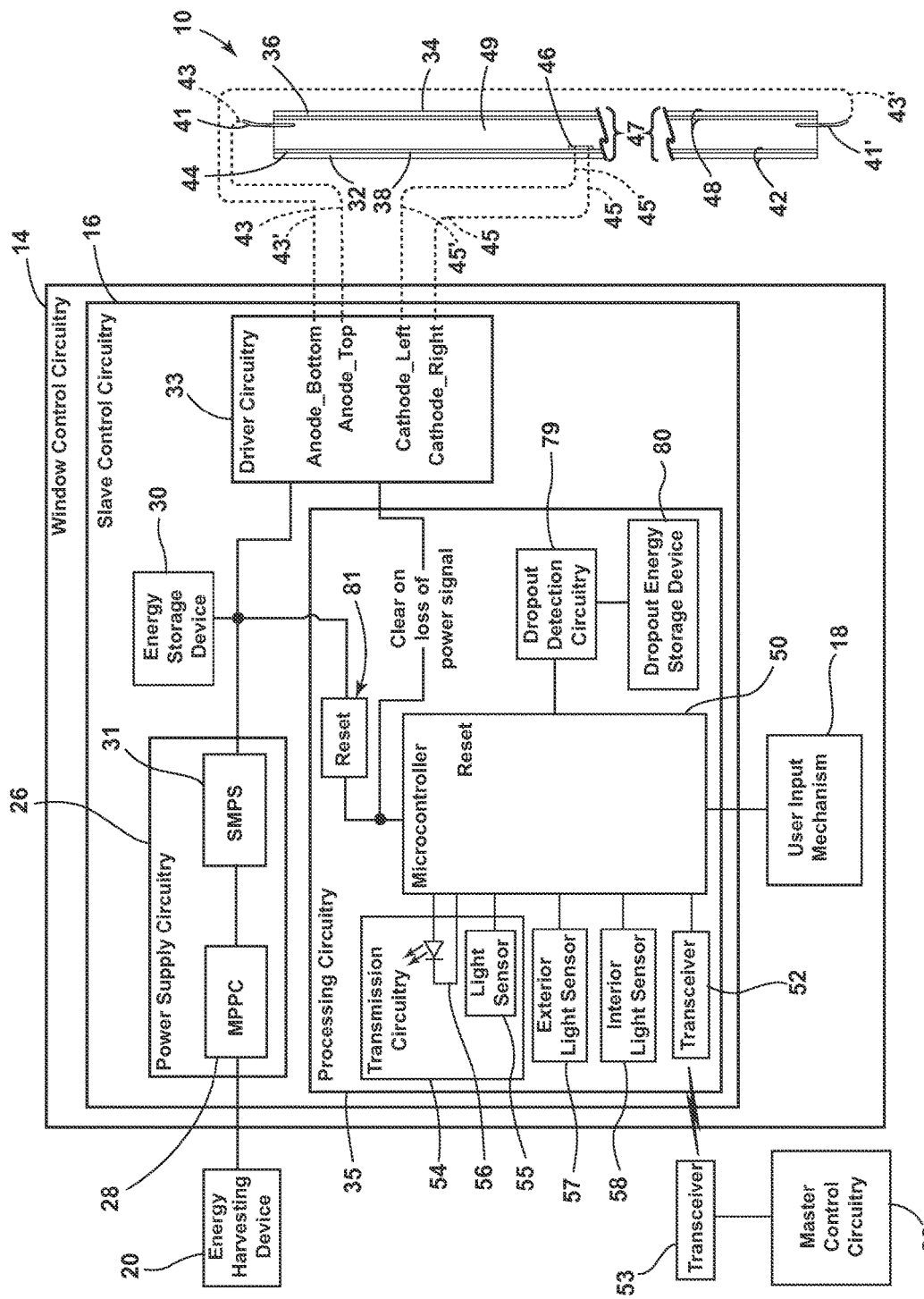
FIG. 3 is a block diagram generally illustrating one embodiment of a slave control circuitry and an user input mechanism for controlling a variable transmission window, that may be used to implement the system for controlling a variable transmission window shown in FIG. 2.

FIG. 3 provides a high level block diagram of the circuitry included in an exemplary window control unit 14. As previously described, the window control unit 14 includes a slave control circuitry 16 coupled to a user input mechanism 18. In addition, the window control unit 14 is electrically coupled to at least one energy harvesting device 20 and at least one variable transmittance window 10 and may be in wireless communication with a master control circuitry 22.

In the illustrated embodiment, the energy harvesting device 20 may include a photovoltaic device (e.g. solar cell) for converting electromagnetic radiation into electrical power. The photovoltaic device may be constructed from a variety of materials such as, but not limited to, cadmium telluride (CdTe), silicon (Si), gallium arsenide (GaAs), and copper indium gallium selenide (CIGS) or a transparent photovoltaic cell such as, but not limited to, a heterojunction organic photovoltaic (OPV) cell, demonstrating peak-absorption in the ultraviolet (UV and/or near-infrared (NIR)). In one embodiment, an OPV cell could be deposited on a portion of the viewable window area or its entirety. In another embodiment, the photovoltaic device is constructed from a material (e.g. cadmium telluride) having high temperature performance capabilities and the ability to be sputtered on a surface such as the perimeter of the window. In this manner, the photovoltaic device may be provided on exposed surfaces of the variable transmittance window 10 and positioned to receive electromagnetic radiation in the form of sunlight and/or cabin lighting. Additionally, or alternatively, the energy harvesting device 20 may include a thermoelectric device such as, but not limited to, a Peltier device, for generating electrical power via a temperature difference between the outside and the inside of an aircraft at cruising altitudes, or an electromagnetic or piezoelectric device configured to convert vibration into electrical power. To generate electrical power, the thermoelectric device may be positioned between two materials of the variable transmittance window 10 or window assembly, wherein the two materials having different temperatures. The option of generating electrical power from both solar and thermoelectric sources may be particularly beneficial when conditions are favorable for one source, but not the other. For instance, during sunset and sunrise, it may be difficult to generate sufficient electrical power through the use of a photoelectric device alone. The same may be said for when a bright moon is present. In these circumstances, the ability to generate electrical power from a thermoelectric, electromagnetic, and/or piezoelectric device may better afford a passenger with the option of changing the transmittance state of a variable transmittance window 10 to block light entry. On the other hand, when an aircraft is grounded or flying at low altitudes, the thermoelectric effect is less pronounced, which may prevent sufficient electrical power from being generated if using the thermoelectric device alone. For those circumstances, the inclusion of a photovoltaic device for power generation may enable continued usage of the variable transmittance window 10.

As shown in FIG. 3, the slave control circuitry 16 includes a power supply circuitry 26 electrically coupled to at least one energy harvesting device 20 and configured to maximize the generated power output from the energy harvesting device 20. The power supply circuitry 26 may include a maximum power point control device (MPPC) 28 configured to sample electrical output from the energy harvesting device 20 and apply a resistance thereto to obtain a maximum electrical power output. An energy harvesting device 20 such as a solar cell has an output voltage that is a function of its load current. The output voltage V is maximized at zero load current (open circuit) and the output current is maximized at zero volts output (short circuit conditions). Neither limit case delivers a significant amount of power $P=V*I$. At some intermediate load current, the output power P will be maximized. A simple method for approximately maximizing P is to limit the current drawn from the energy harvesting device 20 whenever the output voltage drops below a predetermined voltage thus preventing the output voltage from collapsing toward zero. Other more sophisticated maximization schemes are known in the art and can be used for slightly better energy recovery. Once approximated, the maximum electrical power output is used for powering the window control unit 14 and/or charging an energy storage device 30 for later use.

Additionally, or alternatively, the power supply circuitry 26 may also include a switch-mode power supply (SMPS) 31 electrically coupled to the maximum power point control device 28 and the energy storage device 30. The switch-mode power supply 31 is configured to receive electrical power from the maximum power point control device 28 and may adjust the corresponding voltage level according to the consumption needs of the window control unit 14. Electrical energy at the adjusted voltage level may then be used to power the window control unit 14 and/or charge the energy storage device 30 for later use. The switch mode power supply 31 may include a buck-boost converter for either increasing or decreasing voltage to a desired level. Electrochromic windows can exhibit considerable capacitance (multiple Farads) and hence store significant energy in their darkened state. Alternatively, the driver circuitry 33 may include a synchronous buck-boost converter to provide an energy recovery mechanism for when the variable transmittance window 10 is cleared, in which case some electrical power is recovered from the variable transmittance window 10 and stored to the energy storage device 30.

The energy storage device 30 includes, but is not limited to, a capacitor, a super capacitor and/or a rechargeable battery. The energy storage device 30 is electrically coupled to a driver circuitry 33 and a processing circuitry 35 of the slave control circuitry 16, and is configured to power the same. It should be appreciated that more than one power supply circuitry 26 and/or energy storage device 30 may be implemented in the window control unit 14. In one embodiment, the driver circuitry 33 and/or the processing circuitry 35 are provided with their own power supply circuitry 26 and/or energy storage device 30.

Figure 4:
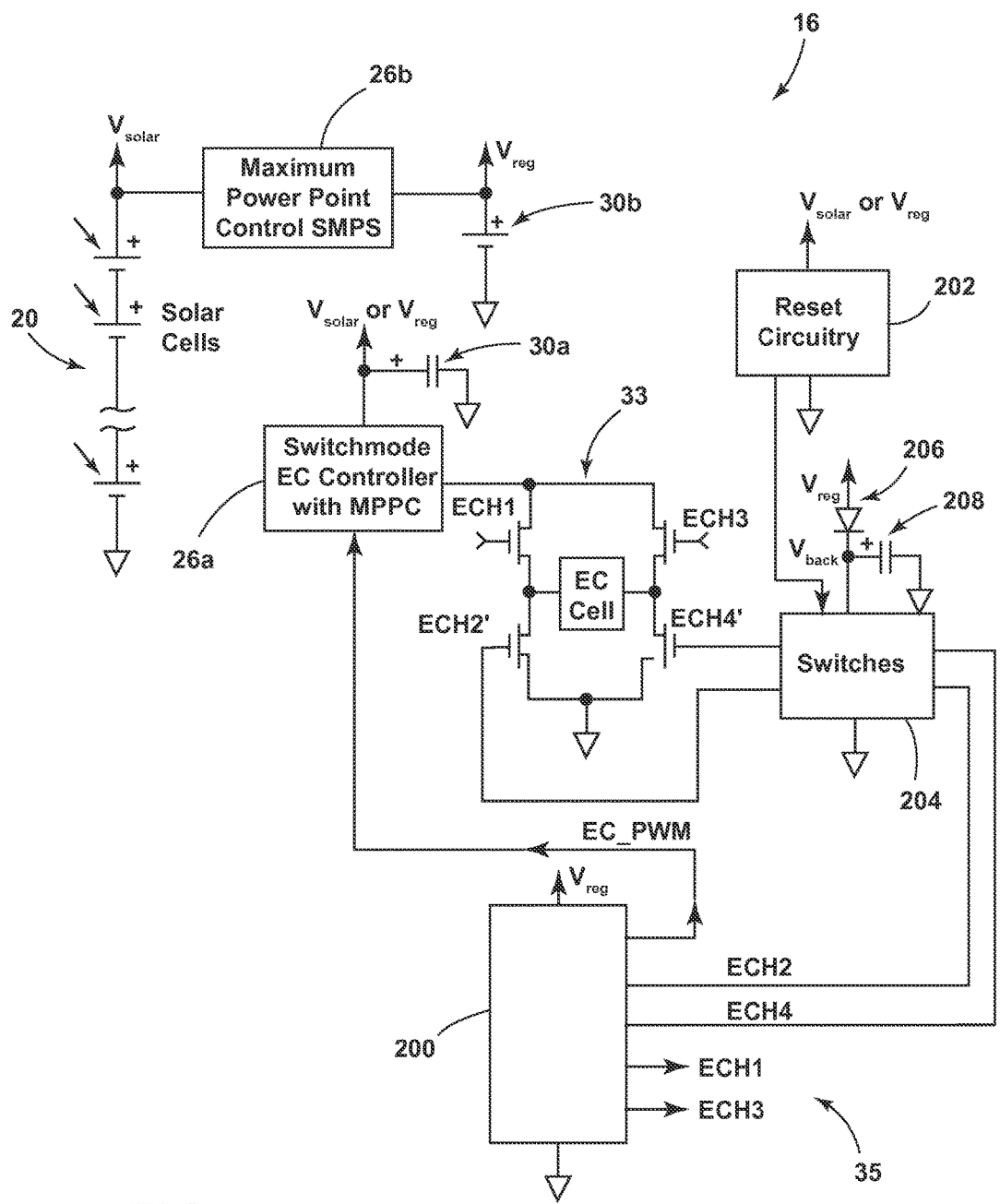
FIG. 4 is a simplified block diagram generally illustrating another embodiment of the slave control circuitry.

For purposes of illustration, and not limitation, one embodiment of a slave control circuitry 16 is shown in FIG. 4, wherein the driver circuitry 33 (shown in an H-bridge configuration) and the processing circuitry 35 each have a power supply circuitry 26a, 26b and an energy storage device 30a, 30b (both shown as a super capacitor), respectively. As is further shown in FIG. 4 for exemplary purposes, the power supply circuitry 26b of the processing circuitry 35 is supplied a solar voltage $V_{solar}$ directly from the energy harvesting device 20 (shown as a photovoltaic device), and outputs a regulated voltage $V_{reg}$, which is applied to the processing circuitry 35 and/or stored in the energy storage device 30b, whereas the power supply circuitry 26a of the driver circuitry 33 may be supplied with either the solar voltage $V_{solar}$ or the regulated voltage $V_{reg}$ and outputs a voltage to be applied to the driver circuitry 33 and/or stored in the energy storing device 30a. Power supply circuitry 26a and 26b can each include a switch-mode power supply and a maximum power point control device. In at least one alternative embodiment, power circuit 26a can use a linear power supply instead of the switch-mode power supply.

With respect to the illustrated embodiment, block 200 represents a subsection of the microcontroller 50 and functions to control the driver circuitry 33. In one embodiment, the driver circuitry 33 is a synchronous buck converter to enable energy stored in a corresponding darkened variable transmittance window 10 to be returned to energy storage device 30b. A RESET circuitry 202 can be provided to control switches 204 that are powered by back voltage $V_{back}$, which is derived from the regulated voltage $V_{reg}$ through a diode 206. In operation, the switches 204 pass ECH2 and ECH4 gate signals through to ECH2' and ECH4' so long as the voltage, $V_{solar}$ or $V_{reg}$, supplied to the RESET circuitry 202 is above a preset voltage threshold. When the voltage supplied to the RESET circuitry 202 falls below a preset voltage threshold, the ECH2' and ECH4' gate signals are connected to the back voltage $V_{back}$, which is held up by an energy storage capacitor 208. The energy storage capacitor 208 provides sufficient energy such that MOSFETs associated with ECH2' and ECH4' are turned on long enough to clear the corresponding variable transmittance window 10.

Figure 5:
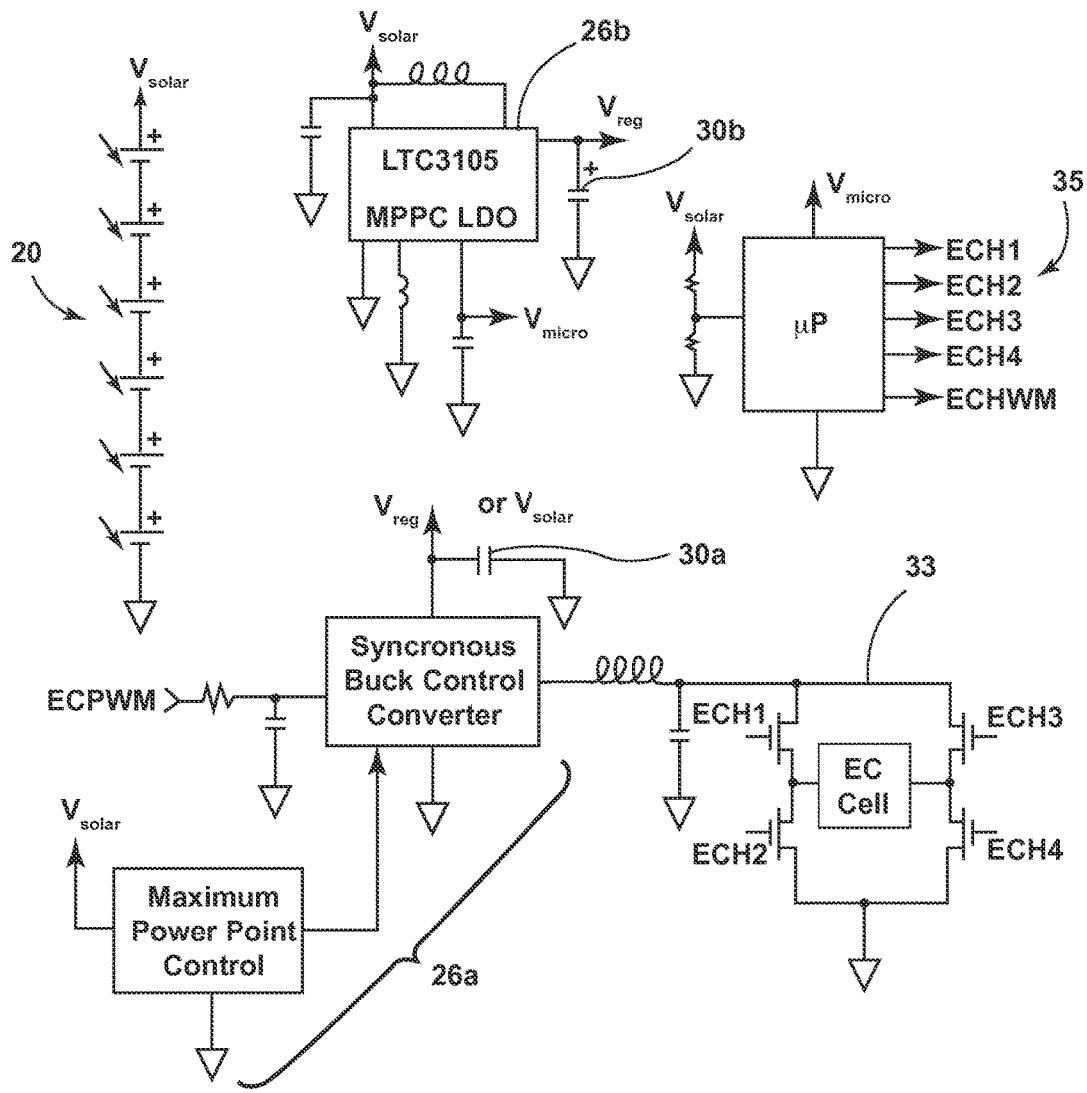
FIG. 5 is a simplified block diagram generally illustrating yet another embodiment of the slave control circuitry.

As is exemplarily shown in FIG. 5, the power supply circuitry 26b of the processing circuitry 35 may be embodied as an integrated unit, and is exemplarily shown as a Linear Technology LTC3105 converter and maximum power point control, and the power supply circuitry 26a of the driver circuitry 33 is exemplarily embodied as a maximum power point control device and a synchronous converter (e.g., synchronous buck converter). With respect to FIGS. 4 and 5, it is to be understood that some components described herein have been omitted for the sake of clarity.

Referring back to FIG. 3, the driver circuitry 33 is configured to receive control signal information, including, but not limited to, a desired transmittance state for the variable transmittance window 10 from the processing circuitry 35. The driver circuitry 33 provides an electrochromic supply 43, also referred to as ANODE_TOP, and an electrochromic supply 43', also referred to as ANODE_BOTTOM, to conducting structures 41 and 41', respectively. The conducting structures 41 and 41' are coupled to a transparent electrically conductive layer 36 deposited on a substrate 34 that is part of an electrochromic element 47. The transparent electrically conductive layer 36 and the substrate 34 are collectively referred to as a first coated substrate 48. Driver circuitry 33 also provides an electrochromic supply 45, also referred to as CATHODE_LEFT, and an electrochromic supply 45', also referred to as CATHODE_RIGHT, to conducting structures 46 and 46', respectively. Conducting structures 46 and 46' are coupled to a transparent electrically conductive layer 38 deposited on a substrate 44 that is part of an electrochromic element 47. The transparent conductive layer 38 and the substrate 44 are collectively referred to as a second coated substrate 42. The driver circuitry 33 may include an H-bridge circuitry and varies the current and/or voltage supplied by the electrochromic supplies 43, 43', 45, and 45' to vary the electronic potential of the conducting structures 41, 42, 46, and 48, and the conductive layers 36 and 38 to achieve a desired transmittance through the electrochromic element 47 based on a transmittance signal provided to the driver circuitry 33 by the processing circuitry 35.

As previously described, the processing circuitry 35 is generally configured to send control signals indicative of a selected transmittance state of a variable transmittance window 10 to the driver circuitry 33. In addition, the processing circuitry 35 can also be configured to receive status information from the driver circuitry 33. This status information includes, but is not limited to, the transmittance state of the variable transmittance window 10, power being supplied to the variable transmittance window 10 by the driver circuitry 33, and status and error condition information associated with the driver circuitry 33 and/or the variable transmittance window 10. In the illustrated embodiment, the processing circuitry 35 includes a microcontroller 50 for controlling the window control unit 14. The microcontroller 50 includes memory for storing instructions and algorithms necessary to control the window control unit 14. The microcontroller 50 also includes logic for executing the instructions and algorithms stored in the memory. The microcontroller 50 is shown coupled to a first transceiver 52, which is wirelessly coupled to a second transceiver 53 of the master control circuitry 22. The first transceiver 52 is configured to receive wireless signals from the master control circuitry 22, decode them, and provide them to the microcontroller 50. Likewise, the second transceiver 53 is configured to receive wireless signals from the microcontroller 50, decode them, and provide them to the master control circuitry 22.

Microcontroller 50 is shown having multiple inputs, multiple outputs, and multiple combined input/output lines for communicating with, and controlling, other devices in the window control unit 14, such as the user input mechanism 18, the power supply circuitry 26, and the driver circuitry 33. In addition, microcontroller 50 is shown coupled to a window transmission circuitry 54 for determining the transmittance state of the variable transmittance window 10. The transmission circuitry 54 includes a light sensor 55 and a light source 56. In operation, the light sensor 55 and the light source 56 are positioned on opposite sides of the variable transmittance window 10. In this arrangement, the microcontroller 50 determines the transmittance state of the variable transmittance window 10 by virtue of the amount of light emanating from the light source 56 that is detected by the light sensor 55.

The microcontroller 50 is also shown coupled to an exterior light sensor 57 and an interior light sensor 58, which provide brightness information related to the outside of an aircraft and the interior cabin, respectively. The brightness information may be used to implement a cabin brightness control system for adjusting the cabin brightness based on directions provided by the master control circuitry 22 to the microcontroller 50. For instance, on flights crossing several time zones, passengers often sleep during daytime hours. In such a situation, a pilot or flight attendant may operate the master control circuitry 22 to issue an override signal for adjusting the cabin brightness by causing one or more variable transmittance windows 10 to darken. Thus, by monitoring the brightness information, the master control circuitry 22 may determine the location of the sun relative to the aircraft and cause the transmittance state of any variable transmittance window 10 to be adjusted accordingly.

The microcontroller 50 is also shown coupled to a dropout detection circuitry 79. The dropout detection circuitry 79 is configured to store a charge on a dropout energy storage device 80 (e.g. rechargeable battery, capacitor, and/or super capacitor) while power is being supplied to the window control unit 14. When power is removed from the window control unit 14, the charge on the drop out energy storage device 80 decays over time. When power is reapplied to the window control unit 14, the amount of charge left on the dropout energy storage device 80 is provided as input to the microcontroller 50, and is used by the microcontroller 50 to determine the approximate amount of time that power was removed from the window control unit 14. If the amount of time that power was removed from window control unit 14 is small, e.g., two seconds or less, the microcontroller 50 directs the variable transmittance window 10 to return to the state that it was in prior to power being removed. On the other hand, if the microcontroller 50 determines that power has been removed for a longer period of time (e.g., longer than two seconds), the microcontroller 50 directs the variable transmittance window 10 to go to a predetermined transmittance state, such as, but not limited to, a clear state.

The microcontroller 50 also includes a reset circuitry 81. The reset circuitry 81 monitors the voltage provided by the power supply circuitry 26 to determine when the voltage falls below a reset voltage threshold. If so, the reset circuitry 81 issues a reset signal for a predetermined period of time. This reset signal is used to reset the microcontroller 50, and is also coupled to the driver circuitry 33 to cause the H-bridge circuitry in the driver circuitry 33 to short the electrochromic supply 43 and the electrochromic supply 45 to ground, causing the variable transmittance window 10 to clear.

As is further shown in FIG. 3, the microcontroller 50 of the processing circuitry 35 is electrically coupled with the user input mechanism 18. The microcontroller 50 receives user input signals from the user input mechanism 18 enabling a passenger to change the transmittance state of the variable transmittance window 10. The user input signals may be inputted in any known manner such as, but not limited to, push buttons, switches, capacitive touch, etc., and the user input mechanism 18 may include various indication devices such as lights, display devices (e.g. LCD display), etc. Indication signals from the microcontroller 50 are provided to the user input mechanism 18 for providing a passenger with status information related to the variable transmittance window 10. For instance, the indication signals may be used to communicate the current transmittance state of the variable transmittance window 10, when a request for a new transmittance state has been received from a user, when a request for a new transmittance state has been received from the master control circuitry 22, when an override signal has been received from the master control circuitry 22, and when an error condition exists in the user input mechanism 18 or other component associated with the window control unit 14. The indication signals may be expressed through the activation of one or more lights and/or messages displayed on the display device.

Figure 6:
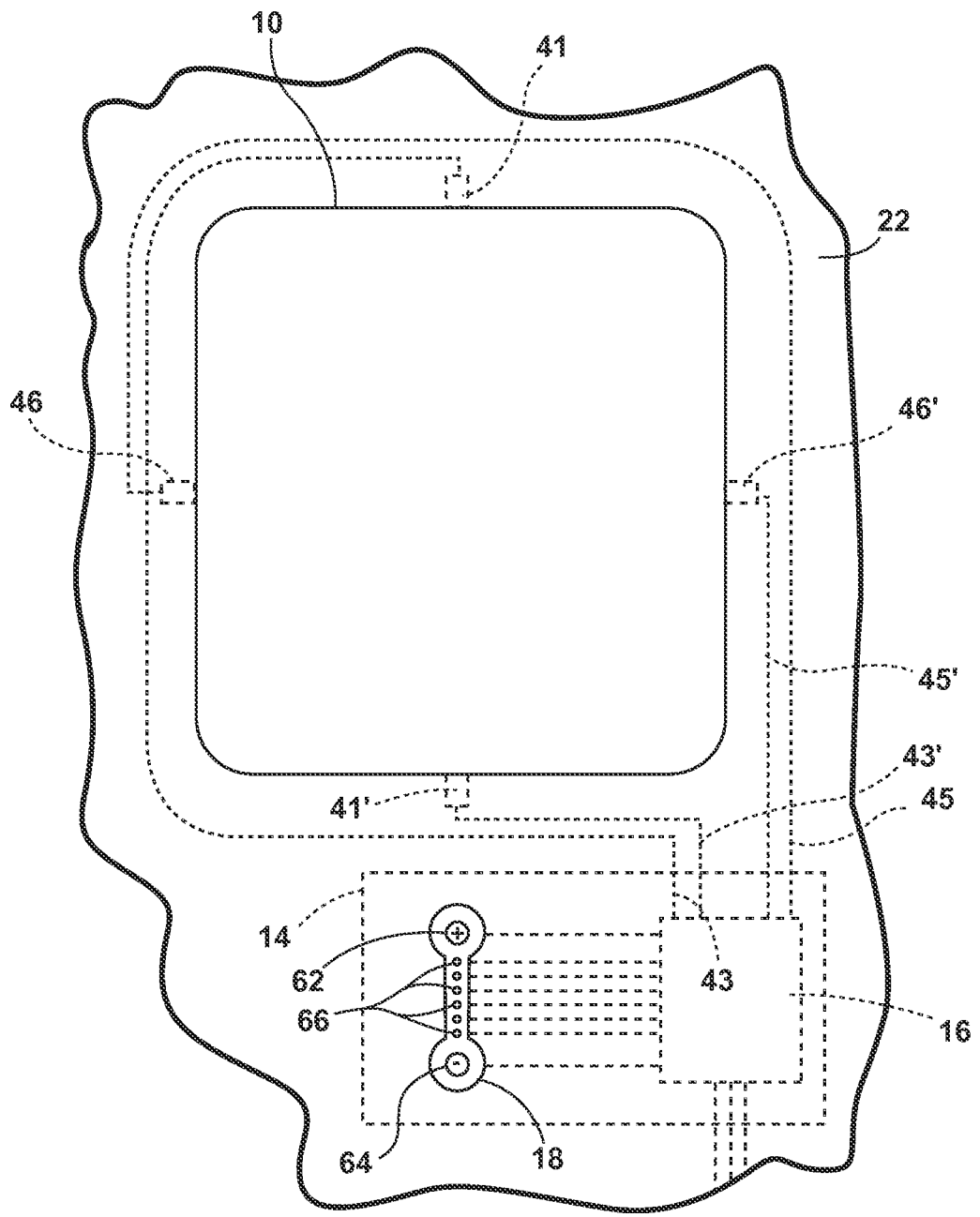
FIG. 6 is a front view generally illustrating a variable transmission window and system for controlling the variable transmission window according to one embodiment of the present invention.

FIG. 6 generally illustrates a variable transmittance window 10, and a window control unit 14, mounted in an airplane. As shown, the variable transmittance window 10 and the window control unit 14 are located adjacent to an inner reveal 22. The window control unit 14 includes a user input mechanism 18, including a first user input area 62, a second user input area 64, and a plurality of indicator lights 66. Also shown in hidden lines are a slave control circuitry 16 and electrochromic supplies 43, 43', 45, and 45' coupled to conducting structures 41, 41', 46, and 46', respectively, of the variable transmittance window 10. As shown, the user input mechanism 18 has a first user input area 62 and a second user input area 64 configured to be physically contacted by a user of the variable transmittance window 10 to change a selected transmittance state of the variable transmittance window 10. The plurality of indicator lights 66 are configured to display light indicating the current transmittance state of the window, the selected transmittance state of the window, whether the window is currently changing states, and/or whether the window control system is in an error state. The user input mechanism 18 can be made of a material that is impervious to moisture, and that is sealed to keep moisture and dirt from internal electrical and mechanical structures of user input mechanism 18 and slave control circuitry 16. Examples of variable transmittance windows for use in aircraft are shown in U.S. Pat. No. 7,990,603 entitled "VARIABLE TRANSMISSION WINDOW SYSTEM," and U.S. Provisional Application No. 61/759,009 entitled "ELECTRO-OPTIC WINDOW ASSEMBLY," the entire disclosures of each of which are incorporated herein by reference.

If using a photovoltaic device for a selected energy harvesting device 20, the photovoltaic device may be disposed along the interior and/or exterior edge of the variable transmittance window 10 to generate electrical power from available cabin light and/or sunlight, respectively. In another embodiment, the photovoltaic device may be disposed around a seal location. With respect to some variable transmittance window 10 constructions, window fascia prevents the seal locations from being viewed by passengers located inside the aircraft. However, the seal locations on the outer side of the variable transmittance window 10 may provide an inconspicuous and aesthetic location for providing the photovoltaic device. In another embodiment, the photovoltaic device may also be adhered or molded-in (integrated) to any foam structures around the window. In yet another embodiment, the photovoltaic device may be coupled to a pressure pane of a variable transmittance window 10. In one embodiment, the photovoltaic device is coupled to the pressure pane and is disposed proximate to the exterior of the plane. In still another embodiment, the photovoltaic device may be a transparent variety, thus allowing it to be directly applied to substantially an entire viewable window area of a variable transmittance window 10. With respect to any of the aforementioned embodiments, reflectors configured to reflect light towards the photovoltaic device may be implemented in or in close proximity to the same area (e.g. seal or foam) in which the photovoltaic device is located to bolster the solar energy conversion process.

The variable transmittance window system 12 can be configured such that the window control units 14 can continue to be powered by the energy harvesting devices 20 even when the vehicle in which the system is installed is not operating. This allows the variable transmittance windows 10 to be darkened while the vehicle is inactive so as to block sunlight from entering and heating the inside of the vehicle cabin. Doing so may also prevent UV damage to items located in the cabin. Thus, if installed in an airplane, the windows can be darkened whenever the airplane is parked outside for extended periods thereby keeping the cabin cooler so that less energy may be required to cool the cabin when used again. Window control units 14 may receive power from the vehicle and may therefore determine that the vehicle is not active when power is no longer received from the vehicle. System 12 may be further configured to either clear windows 10 or maintain windows 10 in their current state for a predetermined time period after power is no longer received from the vehicle and then to automatically darken the windows after the predetermined time period. In this way, the windows 10 may be in a clear state for emergencies or certain vehicle operations such as landing of an airplane for safety reasons and then after a predetermined period (for example, one half hour) of nonoperation of the vehicle, may assume a darkened state.

One way of implementing a method of automatically darkening the windows after a predetermined period after vehicle power is no longer provided, is to prevent the energy harvesting device and/or energy storage device from providing power to the windows 10 until the predetermined period has expired. This may be accomplished using timer circuitry, which may be part of processing circuitry 35 or a separate circuit. If a separate timer circuit is used, a relay may be employed to prevent power from being supplied to driver circuitry 33 and hence windows 10. Alternatively, if timer circuitry is provided in processing circuitry 35, processing circuitry 35 may direct driver circuitry 33 to either clear windows 10 or maintain windows 10 in their current state for the predetermined time period and then may direct driver circuitry 33 to darken the windows 10 after expiration of the predetermined time period. In either case, window control circuitry 14 would include monitoring circuitry to monitor the power, voltage, and/or current on a vehicle power supply line so as to trigger the timer circuitry upon detection that power is no longer being supplied from the vehicle power line.

Another approach to darkening the windows during nonuse while allowing occupants to see out the windows for safety purposes during emergencies or certain vehicle operations such as the landing of an airplane, is to partially darken windows 10 following detection that power is no longer being supplied from the vehicle power line. Windows 10 may be darkened to a level that blocks most of the sunlight while still allowing occupants to see through the windows.

In some of the embodiments above, energy storage device 30 may be charged by a power supply of the vehicle and an energy harvesting device 30 may not be provided. In other embodiments, energy harvesting device 20 may directly power window control circuit 14 and the energy storage device 30 may not be provided. It is also possible that both energy harvesting device 20 and energy storage device 30 are provided.

Figure 7:
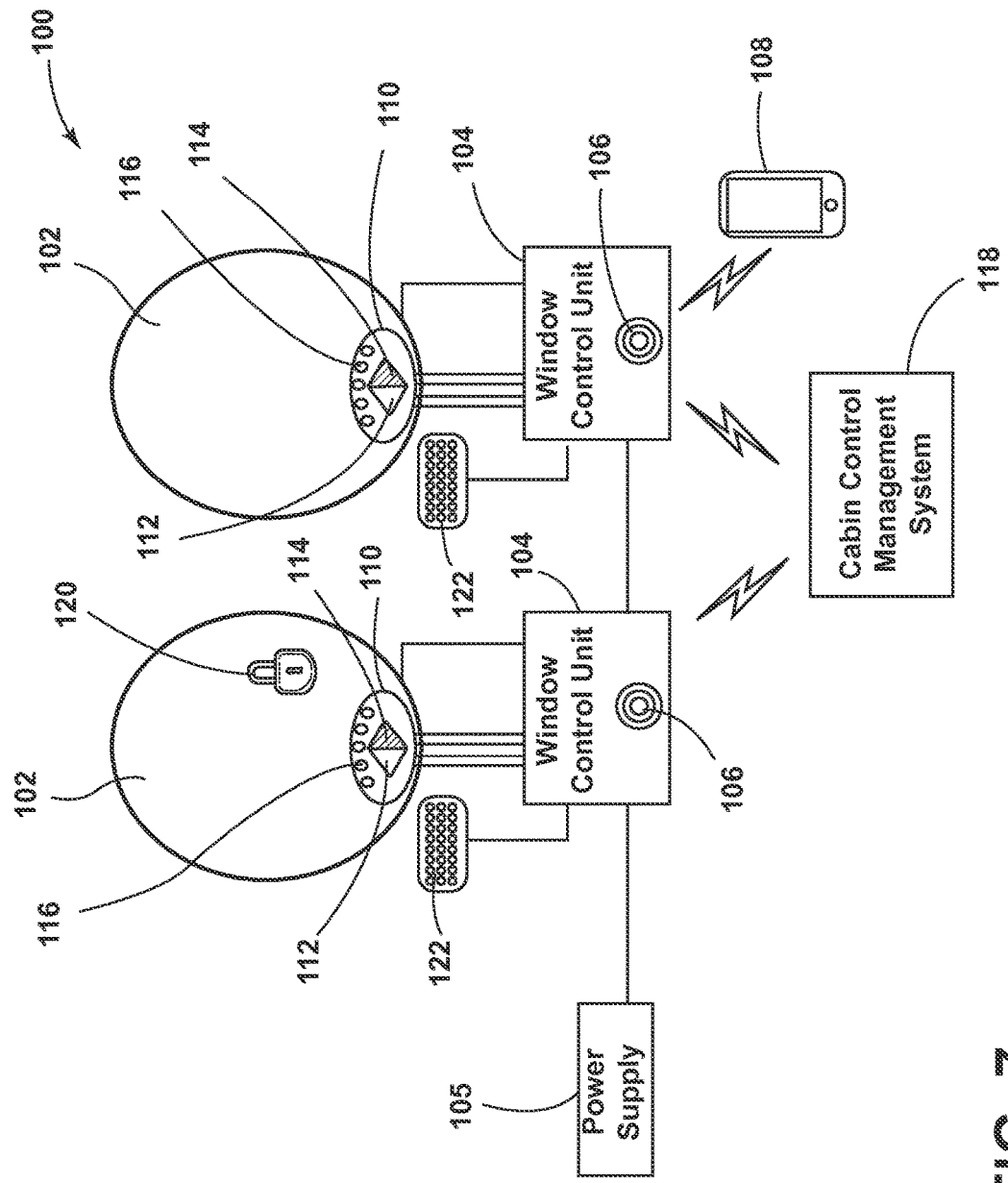
FIG. 7 is a block diagram generally illustrating a system for controlling variable transmission windows, according to at least one embodiment of the present invention.

Referring to FIG. 7, a variable transmittance window system 100 for use in a vehicle is shown according to one embodiment and can include a plurality of variable transmittance windows 102. The transmittance of each window 102 can be controlled by a corresponding window control unit 104, which can be configured similarly to window control unit 14, described previously herein. Each window control unit 104 can be electrically coupled to a vehicle power supply 105 and can have a short range wireless transceiver 106. By way of explanation and not limitation, the short range wireless protocol can be Bluetooth Low Energy (BLE), Bluetooth Low Energy Mesh, Bluetooth, Zigbee, Wi-Fi, the like, or a combination thereof.

For purposes of explanation and not limitation, in operation, one or more users can use a mobile device 108 (e.g., PDA, Smartphone, tablet, iPad®, iPod®, iPhone®, etc.) to communicate with the system 100 via an associated short range wireless transceiver 106. In operation, the mobile device 108 can be used to control a transmittance of a window 102, display operating characteristics of a window 102 (e.g., transmittance level, power consumption, power storage, etc.), the like, or a combination thereof. The mobile device 108 can be configured to control one window 102 (e.g., the passenger has access to control the window they are adjacent to), or a plurality of windows 102 (e.g., a crew member has access to control more than one or all of the windows as a cabin management system).

According to at least one embodiment, one or more of the window control units 104 can include a local control interface (LCI) 110 as a means for allowing a user to control the transmittance of a corresponding window 102. The LCI 110 can function similarly to the user input mechanism 18 described previously herein. The LCI 110 can include buttons 112 and 114, which may allow a user to increase and decrease the transmittance state of a corresponding window 102, respectively. The LCI 110 can also include a transmittance indicator 116, which can be embodied as a plurality of lights, each indicating a different transmittance level. The illumination pattern of the transmittance indicator 116 can be based on the selected transmittance as inputted via the LCI 110 and/or a mobile device 108.

According to at least one embodiment, the system 100 can include a cabin control management system 118 in communication (e.g., wireless communication) with each window control unit 104. The cabin control management system 118 can be configured to control the window transmittance of one or more windows 102. In one embodiment, the cabin control management system 118 can control the window transmittance to be substantially clear, substantially dark, or some intermediary and may do so by overriding a currently selected window transmittance. While the windows 102 are in an override transmittance state, the cabin control management system 118 can prompt the corresponding control units 104 to ignore or limit control commands received from a corresponding LCI 110 and/or mobile device 108. When it is no longer necessary for the windows 102 to be in the override transmittance state, the cabin control management system 118 can remove the overriding conditions and allow passengers to regain full control of window transmittance via the LCI 110 or a mobile device 108. The inclusion of the cabin control management system 118 is particularly useful when system 100 is implemented in an aircraft. In that setting, the cabin control management system 118 can be accessed by a permitted user, such as a flight attendant and/or pilot, to allow the user to control the window transmittance of a single window, groups of windows, windows on a particular side or body region of the aircraft, all windows, etc. This is beneficial when a particular window transmittance may be necessary, such as during take-off and landing. Alternatively, the flight attendant and/or pilot can access the cabin control management system 118 to restrict a passenger's ability to control window transmittance. For example, when a movie is playing in a cabin or when passengers are sleeping, window transmittance may be limited to only darker transmittance states.

According to at least one embodiment, the system 100 can include at least one window 102 having an icon 120 indicating the window transmittance is locked (e.g., controlled by the cabin management system 118). The icon 120 can be an illuminated icon on the window structure (e.g., window, bezel, adjacent cabin area), on the mobile device 108, the like, or a combination thereof. It should be appreciated that other icons indicating a variety of information can be implemented in other embodiments.

According to at least one embodiment, a sensor 122 (e.g., solar cell, photodiode, etc.) can be configured to detect an exterior light level. Additionally or alternatively, the sensor 122, or another sensor, can be positioned and configured to detect an interior light level. In this manner, the corresponding window 102 can be controlled to maintain an interior light level.

According to at least one embodiment, the system 100 can be configured so that any controller (e.g., window control unit 104) can be reconfigured to be a master controller. An example is to have a predefined button sequence that changes the functionality of the controller (e.g., actuate buttons 112 and 114 at the same time for a period of time).

According to at least one embodiment, the system 100 is implemented in an aircraft. The sensor 112 can correspond to solar cells that are configured to be able to supply sufficient power to approximately completely darken the corresponding window 102 while the aircraft is at a cruising altitude. Thus, the number and/or surface area of solar cells is based upon the available solar radiation that can be received at a cruising altitude of an aircraft as opposed to the aircraft being on the ground. The solar cells can be configured to supply adequate power to partially dim the windows 102 while the aircraft is on the ground. By way of explanation and not limitation, about 4 to 6 solar cells can be used, wherein each solar cell has an area of about 143 mm$^2$.

The above description is considered that of the preferred embodiments only. Modifications of the invention will occur to those skilled in the art and to those who make or use the invention. Therefore, it is understood that the embodiments shown in the drawings and described above are merely for illustrative purposes and are intended to be included within, but not intended to limit the scope of the invention, which is defined by the following claims as interpreted according to the principles of patent law, including the doctrine of equivalents.

What is claimed is:

1. A variable transmittance window system of a vehicle, comprising:
    at least one variable transmittance window;
    at least one energy harvesting device configured to generate electrical power;
    at least one energy storage device configured to be charged by the electrical power;
    window control circuitry configured to be powered by a power supply of the vehicle and at least one of the at least one energy harvesting device and the at least one energy storage device, the window control circuitry having processing circuitry and driver circuitry, the driver circuitry configured to receive control information from the processing circuitry to control a transmittance state of the at least one variable transmittance window;
    timer circuitry configured to control the supply of electrical power from at least one of the at least one energy harvesting device and the at least one energy storage device to the driver circuit until the expiration of a predetermined time period, wherein the timer circuitry is triggered to start timing of the predetermined time period upon the window control circuitry detecting that power is no longer being supplied from the power supply of the vehicle, and wherein the timer circuitry is configured to direct the driver circuitry to maintain the at least one variable transmittance window in at least a partially darkened state for the predetermined time period after power is no longer supplied by the vehicle;
    dropout detection circuitry for storing a charge on a dropout energy storage device while power is being supplied to the window control circuitry; and
    master control circuitry to monitor the window control circuitry.

2. The variable transmittance window system as claimed in claim 1, further comprising a short range wireless transceiver to receive commands from a mobile device for controlling the transmittance state of the at least one variable transmittance window.

3. The variable transmittance window system as claimed in claim 1, wherein the at least one energy harvesting device is one of a photovoltaic device, a thermoelectric device, a piezoelectric device, and an electromagnetic device.

4. The variable transmittance window system as claimed in claim 3, wherein the at least one energy harvesting device is a photovoltaic device of a transparent variety that is applied to at least a portion of a viewable window area of the at least one variable transmittance window.

5. The variable transmittance window system as claimed in claim 1, wherein the master control circuitry is operable to issue a wireless override signal to the window control circuitry such that the window control circuitry changes the transmittance state of the at least one variable transmittance window to an override transmittance state.

6. The variable transmittance window system as claimed in claim 1, wherein the charge stored to the dropout energy storage device decays over time when the supply of power is removed from the window control circuitry, and wherein when power is reapplied to the window control circuitry, the amount of charge remaining on the dropout energy storage device is used to determine the amount of time that power was removed from the window control circuitry.

7. The variable transmittance window system as claimed in claim 6, wherein if power was removed for less than a first period of time, the window control circuitry directs the variable transmittance window to return to the transmittance state it was in prior to power being removed, and wherein if power was removed for longer than the first period of time, the window control circuitry directs the variable transmittance window to go to a predetermined transmittance state.

8. The variable transmittance window system as claimed in claim 1, further comprising reset circuitry for monitoring a voltage supplied by the power supply circuitry, wherein if the voltage falls below a reset voltage threshold, the reset circuitry issues a reset signal for a predetermined period of time, thereby resulting in the clearing of the variable transmittance window.

9. A variable transmittance window system of a vehicle, comprising:
    at least one variable transmittance window;
    at least one energy harvesting device configured to generate electrical power;
    at least one energy storage device configured to be charged by the electrical power;
    window control circuitry configured to control a transmittance state of the at least one variable transmittance window, the window control circuitry being powered by a power supply of the vehicle and at least one of the at least one energy harvesting device and the at least one energy storage device; and monitoring circuitry and timer circuitry communicatively coupled to the window control circuitry, wherein the monitoring circuitry is configured to monitor the supply of power from the power supply of the vehicle and trigger the timer circuitry to start timing of a predetermined time period upon detecting that power is no longer being supplied from the power supply of the vehicle, and wherein the window control circuitry responds to the triggering of the timer circuitry by maintaining the at least one variable transmittance window in at least a partially darkened state for the predetermined time period after power is no longer supplied by the vehicle.

10. The variable transmittance window system as claimed in claim 9, further comprising master control circuitry that issues a wireless override signal to the window control circuitry such that the window control circuitry changes the transmittance state of the at least one variable transmittance window to an override transmittance state.

11. The variable transmittance window system as claimed in claim 9, further comprising a short range wireless transceiver to receive commands from a mobile device for controlling the transmittance state of the at least one variable transmittance window.

12. The variable transmittance window system as claimed in claim 9, wherein the at least one energy harvesting device is one of a photovoltaic device, a thermoelectric device, a piezoelectric device, and an electromagnetic device.

13. The variable transmittance window system as claimed in claim 12, wherein the at least one energy harvesting device is a photovoltaic device of a transparent variety that is applied to at least a portion of a viewable window area of the at least one variable transmittance window.

14. A variable transmittance window system of a vehicle, comprising:
at least one variable transmittance window;
at least one energy harvesting device configured to generate electrical power;
at least one energy storage device configured to be charged by the electrical power;
window control circuitry configured to control a transmittance state of the at least one variable transmittance window, the window control circuitry being powered by a power supply of the vehicle and at least one of the at least one energy harvesting device and the at least one energy storage device;

monitoring circuitry and timer circuitry communicatively coupled to the window control circuitry, wherein the monitoring circuitry is configured to monitor the supply of power from the power supply of the vehicle and trigger the timer circuitry to start timing of a predetermined time period upon detecting that power is no longer being supplied from the power supply of the vehicle, and wherein the window control circuitry responds to the triggering of the timer circuitry by maintaining the at least one variable transmittance window in a current transmittance state for the predetermined time period after power is no longer supplied by the vehicle and then darkens the at least one variable transmittance window after expiration of the predetermined time period.

15. The variable transmittance window system as claimed in claim 14, further comprising master control circuitry that issues a wireless override signal to the window control circuitry such that the window control circuitry changes the transmittance state of the at least one variable transmittance window to an override transmittance state.

16. The variable transmittance window system as claimed in claim 14, further comprising a power supply circuit for maximizing the electrical power and providing a voltage adjustment to the electrical power, the voltage adjustment being performed by a synchronous converter.

17. The variable transmittance window system as claimed in claim 14, further comprising an energy recovery mechanism to store an electrical charge in the at least one energy storage device when the variable transmittance window is powered down.

18. The variable transmittance window system as claimed in claim 14, wherein the at least one energy harvesting device is one of a photovoltaic device, a thermoelectric device, a piezoelectric device, and an electromagnetic device.

* * * * *